United States Patent
Kushima (10) Patent No.: US 11,228,236 B2
(45) Date of Patent: Jan. 18, 2022

(54) BOOST CONVERTER CONTROLLER

(71) Applicant: DENSO CORPORATION, Kariya (JP)

(72) Inventor: Hajime Kushima, Toyota (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/868,030

(22) Filed: May 6, 2020

(65) Prior Publication Data
US 2020/0373840 A1 Nov. 26, 2020

(30) Foreign Application Priority Data
May 22, 2019 (JP) .............................. JP2019-095963

(51) Int. Cl.
*H02M 1/32* (2007.01)
*H02M 3/158* (2006.01)
*B60L 50/60* (2019.01)

(52) U.S. Cl.
CPC ............. *H02M 1/327* (2021.05); *B60L 50/60* (2019.02); *H02M 1/32* (2013.01); *H02M 3/158* (2013.01); *B60L 2210/14* (2013.01); *B60L 2240/525* (2013.01); *B60L 2240/662* (2013.01)

(58) Field of Classification Search
CPC ......... B06L 2240/525; B06L 2240/662; B06L 2210/14; H02M 1/32; H02M 1/327
See application file for complete search history.

(56) References Cited

U.S. PATENT DOCUMENTS

2017/0225571 A1* 8/2017 Jojima .................. B60L 15/007
2018/0302020 A1* 10/2018 Sachimori ............. B60L 3/0038
2020/0220480 A1* 7/2020 Arao ..................... H02H 7/1216

FOREIGN PATENT DOCUMENTS

JP 2015-220840 A 12/2015
JP 2018-014828 A 1/2018

* cited by examiner

Primary Examiner — Rafael O De Leon Domenech
(74) Attorney, Agent, or Firm — Sughrue Mion, PLLC (57) ABSTRACT

There is provided a driving system configured to control an input current of a boost converter when temperature of a reactor becomes higher than a temperature reference value that is lower than a heatproof temperature of the reactor, compared with the input current when the temperature of the reactor is equal to or lower than the temperature reference value. A first temperature is set to the temperature reference value when ambient temperature is equal to or higher than a predetermined temperature. A second temperature that is higher than the first temperature is set to the temperature reference value when the ambient temperature is lower than the predetermined temperature.

5 Claims, 6 Drawing Sheets

BOOST CONVERTER CONTROLLER

CROSS-REFERENCE TO RELATED APPLICATIONS

The present disclosure claims priority to Japanese Patent Application No. 2019-095963 filed May 22, 2019, which is incorporated herein by reference in its entirety including specification, drawings and claims.

TECHNICAL FIELD

The present disclosure relates to a driving system and more specifically relates to a driving system equipped with a boost converter having a reactor and with a capacitor.

BACKGROUND

A proposed configuration of a driving system provided with a DC/DC converter including a switching element, a diode and a reactor and with a capacitor limits the input current of the DC/DC converter, based on the temperature of the reactor and the temperature of the capacitor (as described in, for example, JP 2015-220840A). This driving system sets the smaller value between a limiting current value for protecting the reactor based on the temperature of the reactor and a limiting current value for protecting the capacitor based on the temperature of the capacitor, as a limiting current value with regard to the input current of the DC/DC converter, and controls the DC/DC converter, such that the input current of the DC/DC converter becomes equal to or lower than the limiting current value.

SUMMARY

A recently proposed technique in such a driving system protects the reactor and the capacitor not by providing a temperature sensor mounted to the capacitor (i.e., not directly detecting the temperature of the capacitor) but by limiting the input current of the DC/DC converter when the temperature of the reactor becomes higher than a temperature reference value that is lower than a heatproof temperature of the reactor, compared with the input current when the temperature of the reactor is equal to or lower than the temperature reference value. In general, the capacitor has a smaller amount of increase in temperature relative to an increase in electric current (i.e., has a lower sensitivity) than the reactor. The electric current of the reactor is equivalent to the input current of the DC/DC converter, and the electric current of the capacitor depends on the input current of the DC/DC converter. Accordingly, the lower ambient temperature (i.e., the larger difference between the heatproof temperature of the reactor or the capacitor and the ambient temperature) is likely to give the larger upper limit value of the input current of the DC/DC converter that is capable of protecting the capacitor, compared with the upper limit value of the input current of the DC/DC converter that is capable of protecting the reactor. By taking into account the foregoing, uniformly setting a relatively low value to the temperature reference value regardless of the ambient temperature causes the input current of the DC/DC converter to be limited in a range of low ambient temperature irrespective of a sufficient available capacity for protecting the capacitor. This is likely to cause deterioration of the performance of the boost converter.

A main object of a driving system of the present disclosure is to protect a reactor of a boost converter and a capacitor mounted on a high voltage-side of the boost converter based on temperature of the reactor and to suppress deterioration of the performance of the boost converter in the state of low ambient temperature.

The driving system of the present disclosure is implemented by the following aspect, in order to achieve the main object described above.

The present disclosure is directed to a driving system. The driving system includes a boost converter provided to include a switching element, a diode and a reactor and configured to step up a voltage of an electric power of a low voltage-side power line that is connected with a power source and supply the electric power of the stepped-up voltage to a high voltage-side power line that is connected with a power device, a capacitor mounted to the high voltage-side power line and a control device configured to control an input current of the boost converter when temperature of the reactor becomes higher than a temperature reference value that is lower than a heatproof temperature of the reactor, compared with the input current when the temperature of the reactor is equal to or lower than the temperature reference value. The control device sets a first temperature to the temperature reference value when ambient temperature is equal to or higher than a predetermined temperature, and sets a second temperature that is higher than the first temperature to the temperature reference value when the ambient temperature is lower than the predetermined temperature.

The driving system according to this aspect of the present disclosure is configured to control the input current of the boost converter when the temperature of the reactor becomes higher than the temperature reference value that is lower than the heatproof temperature of the reactor, compared with the input current when the temperature of the reactor is equal to or lower than the temperature reference value. The first temperature is set to the temperature reference value when the ambient temperature is equal to or higher than the predetermined temperature. The second temperature that is higher than the first temperature is set to the temperature reference value when the ambient temperature is lower than the predetermined temperature. This configuration protects the reactor and the capacitor based on the temperature of the reactor and suppresses deterioration of the performance of the boost converter in the state of low ambient temperature.

DESCRIPTION OF EMBODIMENTS

Some aspects of the present disclosure are described below with reference to embodiments.

Figure 1:
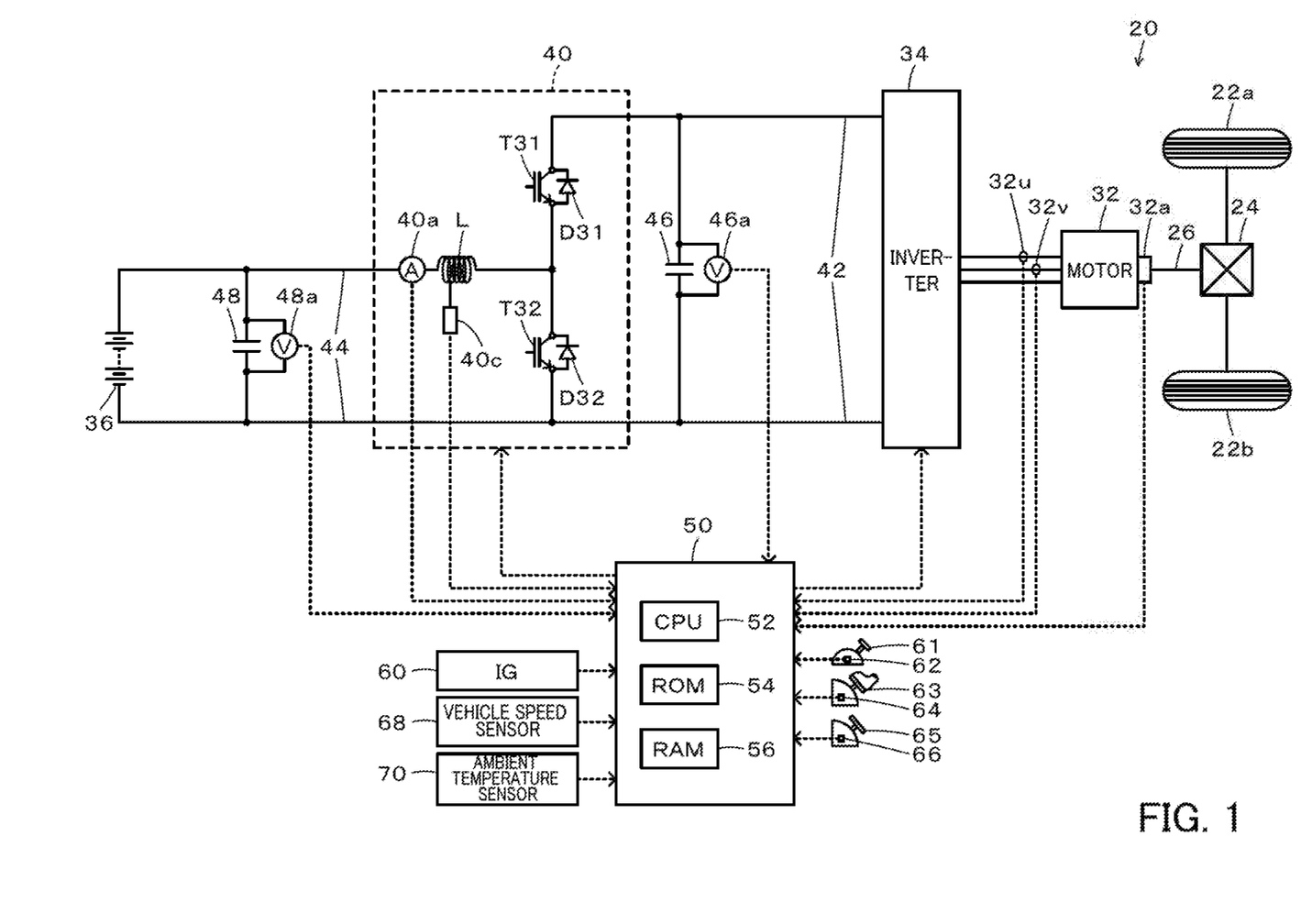
FIG. 1 is a configuration diagram illustrating the schematic configuration of an electric vehicle equipped with a driving system according to one embodiment of the present disclosure.

FIG. 1 is a configuration diagram illustrating the schematic configuration of an electric vehicle 20 equipped with a driving system according to one embodiment of the present disclosure. As illustrated, the electric vehicle 20 of the embodiment includes a motor 32, a battery 36 serving as a power storage device, a boost converter 40, capacitors 46 and 48, and an electronic control unit 50. According to the embodiment, the boost converter 40, the capacitor 46 and the electronic control unit 50 mainly correspond to the "driving system".

The motor 32 is configured as a synchronous generator motor and includes a rotor with permanent magnets embedded in a rotor core and a stator with three-phase coils wound on a stator core. The rotor of this motor 32 is connected with a driveshaft 26 that is linked with drive wheels 22a and 22b via a differential gear 24. The inverter 34 is used to drive the motor 32 and is connected with the boost converter 40 via high voltage-side power lines 42. The electronic control unit 50 performs switching control of a plurality of switching elements included in the inverter 34, so as to drive and rotate the motor 32. The battery 36 is configured as, for example, a lithium ion rechargeable battery or a nickel metal hydride battery and is connected with the boost converter 40 via low voltage-side power lines 44.

The boost converter 40 is connected with the high voltage-side power lines 42 and with the low voltage-side power lines 44 and includes two transistors T31 and T32, two diodes D31 and D32 that are respectively connected in parallel with the two transistors T31 and T32, and a reactor L. The transistor T31 is connected with a positive electrode line of the high voltage-side power lines 42. The transistor T32 is connected with the transistor T31 and with negative electrode lines of the high voltage-side power lines 42 and of the low voltage-side power lines 44. The reactor L is connected with a connection point between the transistors T31 and T32 and with a positive electrode line of the low voltage-side power lines 44. The reactor L and the capacitor 46 are placed in an identical housing. In response to regulation of a ratio of ON times of the transistors T31 and T32 by the electronic control unit 50, the boost converter 40 serves to step up the voltage of electric power of the low voltage-side power lines 44 and supply the electric power of the stepped-up voltage to the high voltage-side power lines 42 and to step down the voltage of electric power of the high voltage-side power lines 42 and supply the electric power of the stepped-down voltage to the low voltage-side power lines 44. The capacitor 46 is mounted to the positive electrode line and the negative electrode line of the high voltage-side power lines 42, whereas the capacitor 48 is mounted to the positive electrode line and the negative electrode line of the low voltage-side power lines 44.

The electronic control unit 50 is configured as a CPU 52-based microprocessor and includes a ROM 54 configured to store processing programs, a RAM 56 configured to temporarily store data, and input/output ports, in addition to the CPU 52. Signals from various sensors are input into the electronic control unit 50 via the input port. The signals input into the electronic control unit 50 include, for example, a rotational position θm from a rotational position detection sensor (for example, resolver) 32a configured to detect the rotational position of the rotor of the motor 32; and phase currents Iu and Iv from current sensors 32u and 32v configured to detect the phase currents flowing in the respective phases of the motor 32. The input signals also include an electric current IL of the reactor L (i.e., input current of the boost converter 40 (where the direction of electric current from the low voltage-side power lines 44 to the reactor L is set as a positive direction)) from a current sensor 40a mounted in series with the reactor L of the boost converter 40; a temperature TL of the reactor L from a temperature sensor 40c mounted to the reactor L; a voltage VH of the capacitor 46 (i.e., of the high voltage-side power lines 42) from a voltage sensor 46a placed between terminals of the capacitor 46; and a voltage VL of the capacitor 48 (i.e., of the low voltage-side power lines 44) from a voltage sensor 48a placed between terminals of the capacitor 48. The input signals further include an ignition signal from an ignition switch 60; and a shift position SP from a shift position sensor 62 configured to detect an operating position of a shift lever 61. The input signals additionally include an accelerator position Acc from an accelerator pedal position sensor 64 configured to detect a depression amount of an accelerator pedal 63; a brake pedal position BP from a brake pedal position sensor 66 configured to detect a depression amount of a brake pedal 65; a vehicle speed V from a vehicle speed sensor 68; and an ambient temperature Ta from an ambient temperature sensor 70.

Various control signals are output from the electronic control unit 50 via the output port. The signals output from the electronic control unit 50 include, for example, switching control signals to the plurality of switching elements included in the inverter 34, and switching control signals to the transistors T31 and T32 of the boost converter 40. The electronic control unit 50 calculates an electrical angle θe and a rotation speed Nm of the motor 32, based on the rotational position θm of the rotor of the motor 32 input from the rotational position detection sensor 32a. The electronic control unit 50 also calculates a state of charge SOC of the battery 36, based on an integrated value of electric current Ib of the battery 36 input from a current sensor (not shown). The state of charge SOC herein denotes a ratio of the amount of electric power accumulated in the battery 36 (i.e., the amount of dischargeable electric power) to the overall capacity of the battery 36.

In the electric vehicle 20 of the embodiment having the configuration described above, the electronic control unit 50 sets a required torque Td* that is required for the driveshaft 26, based on the accelerator position Acc input from the accelerator pedal position sensor 64 and the vehicle speed V input from the vehicle speed sensor 68, and also sets a tentative torque command Tmtmp that is a tentative value of a torque command Tm* of the motor 32, such that the set required torque Td* is output to the driveshaft 26. The electronic control unit 50 subsequently sets an allowable torque Tmlim of the motor 32, based on an allowable current ILlim of the reactor L, sets the torque command Tm* of the motor 32 by limiting the tentative torque command Tmtmp of the motor 32 to the allowable torque Tmlim (upper limit guarding), and performs switching control of the plurality of switching elements included in the inverter 34, such as to drive the motor 32 with the torque command Tm*. The electronic control unit 50 also sets a target voltage VH* of the high voltage-side power lines 42, such as to drive the motor 32 with the torque command Tm*, sets a target current IL* of the reactor L, such that a difference between the voltage VH of the high voltage-side power lines 42 input from the voltage sensor 46a and the target voltage VH* is cancelled out in a range of the allowable current ILlim of the reactor L, and performs switching control of the transistors T31 and T32 included in the boost converter 40, such that a difference between the electric current IL of the reactor L input from the current sensor 40a and the target current IL* is cancelled out.

Figure 2:
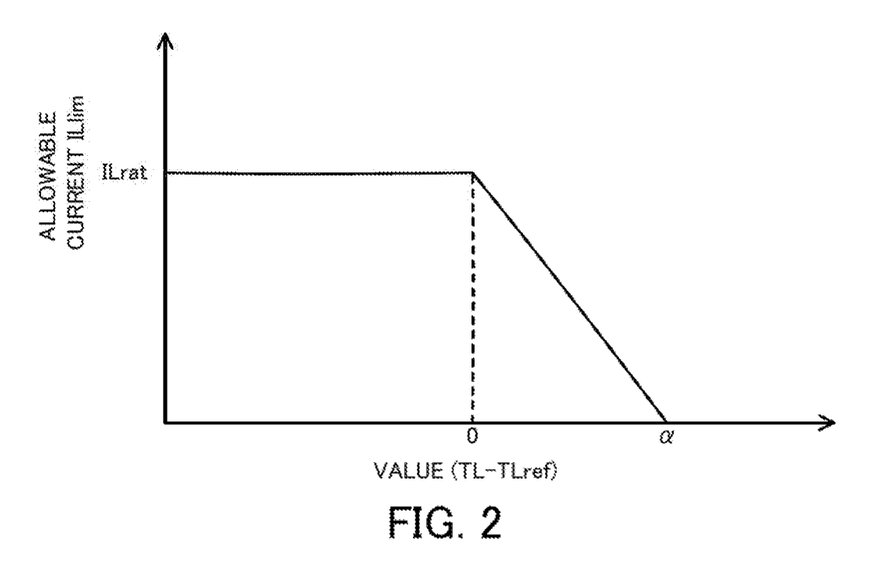
FIG. 2 is a diagram illustrating one example of an allowable current setting map.

The following describes the allowable current ILlim of the reactor L. The allowable current ILlim of the reactor L is set such as to suppress the temperature TL of the reactor L from exceeding a heatproof temperature TLhr (for example, about 170° C. to 180° C.), by taking into account that the amount of heat generation of the reactor L increases with an increase in absolute value of the electric current IL of the reactor L. According to the embodiment, a procedure of setting this allowable current ILlim of the reactor L specifies in advance a relationship of a value (TL−TLref) obtained by subtracting a temperature reference value TLref (either of predetermined temperatures TL1 and TL2 described later) from the temperature TL of the reactor L to the allowable current ILlim of the reactor L and stores the specified relationship as an allowable current setting map in the ROM 54. When the value (TL−TLref) is given, the procedure reads out a value of the allowable current ILlim of the reactor L corresponding to this given value from the map and sets the allowable current ILlim. The temperature reference value TLref is set to be slightly lower (for example, about 10° C. to 25° C. lower) than the heatproof temperature TLhr of the reactor L. A method of setting this temperature reference value TLref will be described later. FIG. 2 is a diagram illustrating one example of the allowable current setting map. As illustrated, the allowable current ILlim of the reactor L is set to a rated current ILrat of the reactor L in a range of the value (TL−TLref) that is equal to or smaller than a value 0, is set to decrease from the rated current ILrat to become closer to a value 0 in a range of the value (TL−TLref) that is larger than the value 0 and that is smaller than a positive value α, and is set to the value 0 in a range of the value (TL−TLref) that is equal to or larger than the value α. Accordingly, the temperature reference value TLref means an upper limit of a temperature range of the reactor L where the allowable current ILlim of the reactor L is set to the rated current ILrat. A value (TLref+α) obtained by adding the value α to the temperature reference value TLref means a lower limit of a temperature range of the reactor L where the allowable current ILlim of the reactor L is set to the value 0. The value α is determined as a smaller value than a difference between the heatproof temperature TLhr of the reactor L and the temperature reference value TLref and is, for example, about 3° C. to 5° C.

The following describes the allowable torque Tmlim of the motor 32. The allowable torque Tmlim of the motor 32 is set such as to suppress the electric current II of the reactor L from exceeding the allowable current ILlim. According to the embodiment, a procedure of setting this allowable torque Tmlim of the motor 32 specifies in advance a relationship of the allowable current ILlim of the reactor L to the allowable torque Tmlim of the motor 32 and stores the specified relationship as an allowable torque setting map in the ROM 54. When a value of the allowable current ILlim of the reactor L is given, the procedure leads out a value of the allowable torque Tmlim of the motor 32 corresponding to this given value from the map and sets the allowable torque Tmlim. The allowable torque Tmlim of the motor 32 is set to increase with an increase in the allowable current ILlim of the reactor L. According to the embodiment, when the allowable current ILlim of the reactor L is set to the rated current ILrat, the allowable torque Tmlim of the motor 32 is set to a rated torque Tmrat of the motor 32.

Figure 3:
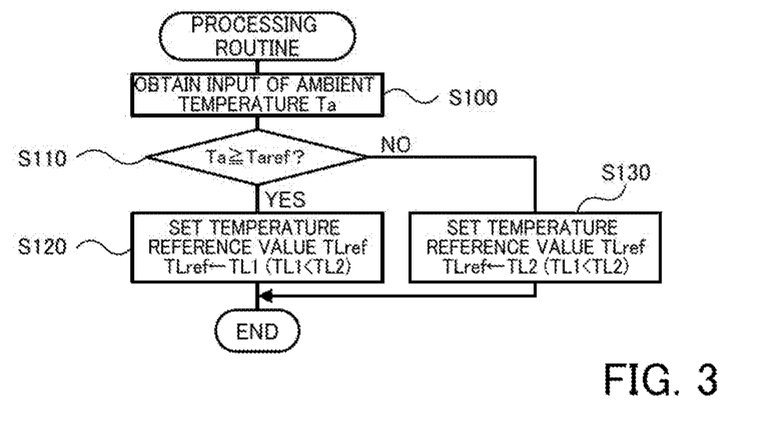
FIG. 3 is a flowchart showing one example of a processing routine performed by an electronic control unit.

The following describes operations of the driving system mounted on the electric vehicle 20 of the embodiment having the configuration described above or more specifically a series of operations to set the temperature reference value TLref that is used for setting the allowable current ILlim of the reactor L. FIG. 3 is a flowchart showing one example of a processing routine performed by the electronic control unit 50.

When the processing routine of FIG. 3 is triggered, the CPU 52 of the electronic control unit 50 obtains the input of the ambient temperature Ta from the ambient temperature sensor 70 (step S100) and compares the input ambient temperature Ta with a temperature reference value Taref (step S110). When the ambient temperature Ta is equal to or higher than the temperature reference value Taref, the CPU 52 sets a predetermined temperature TL1 to the temperature reference value TLref (step S120) and then terminates this routine. When the ambient temperature Ta is lower than the temperature reference value Taref, on the other hand, the CPU 52 sets a predetermined temperature TL2 that is higher than the predetermined temperature TL1, to the temperature reference value TLref (step S130) and then terminates this routine. The predetermined temperature TL1 used herein is, for example, a temperature of lower than the heatproof temperature TLhr of the reactor L by about 20° C. to 25° C. The predetermined temperature TL2 used herein is, for example, a temperature of lower than the heatproof temperature TLhr of the reactor by about 10° C. to 15° C. The following describes a method of setting the predetermined temperatures TL1 and TL2 and the temperature reference value Taref.

In order to set the predetermined temperatures TL1 and TL2 and the temperature reference value Taref, the inventors have determined predetermined-time target currents ILa, ILb and ILc with regard to respective values of the ambient temperature Ta in an expected temperature range (i.e., a temperature range of a lower limit temperature Tamin (for example, about −30° to −20° C.) to an upper limit temperature Tamax (for example, about 40° C. to 50° C.)) by analyses and experiments. The predetermined-time target currents IIa and IIb herein respectively denote values of the target current IL* of the reactor L when the temperature TL of the reactor L is stabilized at (converged to) the respective predetermined temperatures TL1 and TL2 in the course of continuous execution of a predetermined control, which controls the boost converter 40 to cancel out differences between the electric current IL of the reactor L and the predetermined-time target currents ILa and ILb at a fixed value of the target current IL* of the reactor L. The predetermined-time target current ILc denotes a value of the target current IL* of the reactor L when a temperature Tc of the capacitor 46 is stabilized at a predetermined temperature Tc1 that is slightly lower (for example, about 5° C. to 15° C. lower) than a heatproof temperature Tchr of the capacitor 46 in the course of continuous execution of the predetermined control.

Figure 4:
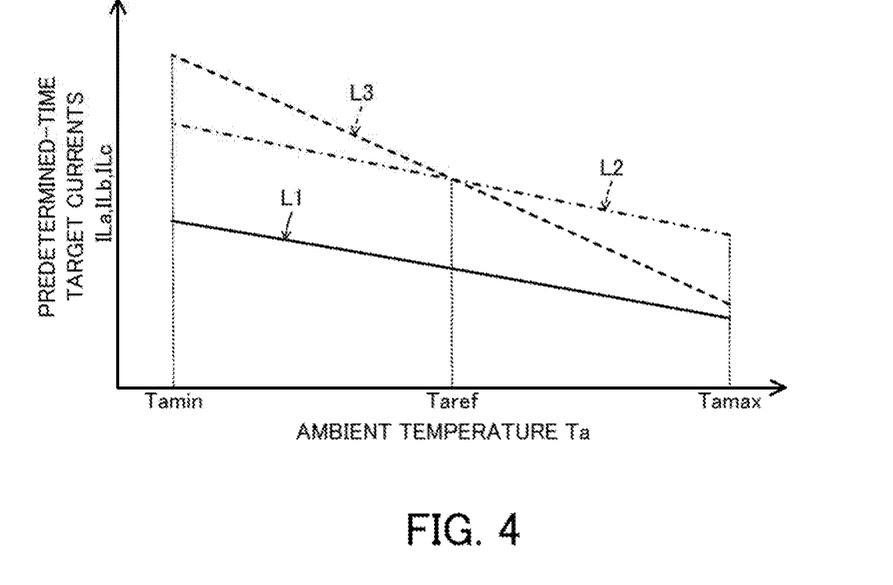
FIG. 4 is a diagram illustrating one example of relationships of predetermined-time target currents ILa, ILb and ILc of a reactor L to ambient temperature Ta.

FIG. 4 is a diagram illustrating one example of relationships of predetermined-time target currents ILa, ILb and ILc of a reactor L to ambient temperature Ta. In FIG. 4, a line L1 (shown as a solid line graph) indicates a relationship between the ambient temperature Ta and the predetermined-time target current ILa of the reactor L. A line L2 (shown as a one-dot chain line graph) indicates a relationship between the ambient temperature Ta and the predetermined-time target current ILb of the reactor L. A line L3 (shown as a broken line graph) indicates a relationship between the ambient temperature Ta and the predetermined-time target current ILc of the reactor L.

As illustrated, the lines L1 and L2 are set, such that the predetermined-time target currents ILa and ILb increase with a decrease in the ambient temperature Ta and that the line L2 is present above the line L1 (i.e., the line L2 has a larger value of the target current IL*) with regard to an arbitrary value of the ambient temperature Ta. The stabilized value (convergence value) of the temperature TL of the reactor L in the course of continuous execution of the predetermined control depends on the ambient temperature Ta (i.e., an initial temperature of the reactor L) and on an amount of increase in temperature ΔTL of the reactor L, which is, for example, based on the electric current IL of the reactor L (on the basis of the target current IL*) and a cooling performance for the reactor L. More specifically, the differences between the predetermined temperatures TL1 and TL2 and the ambient temperature Ta increase with a decrease in the ambient temperature Ta, and the amount of increase in temperature ΔTL of the reactor L increases with an increase in the electric current IL of the reactor L. These factors determine the relationships between the ambient temperature Ta and the predetermined-time target currents ILa and ILb.

As illustrated, the line L3 is set, such that the predetermined-time target current ILc increases with a decrease in the ambient temperature Ta and that the line L3 has a larger absolute value of a slope than those of the lines L1 and L2. The stabilized value of the temperature Tc of the capacitor 46 in the course of continuous execution of the predetermined control depends on the ambient temperature Ta (i.e., an initial temperature of the capacitor 46) and on an amount of increase in temperature ΔTc of the capacitor 46, which is, for example, based on an electric current Ic of the capacitor 46 (on the basis of the electric current IL and thereby the target current IL* of the reactor L) and a cooling performance for the capacitor 46. More specifically, the difference between the predetermined temperature Tc1 and the ambient temperature Ta increases with a decrease in the ambient temperature Ta, and the amount of increase in temperature ΔTc of the capacitor 46 increases with an increase in the electric current Ic of the capacitor 46. In general, the capacitor 46 has a smaller amount of increase in temperature relative to an increase in electric current (i.e., has a lower sensitivity), compared with the reactor L. These factors determine the relationship between the ambient temperature Ta and the predetermined-time target current ILc.

According to the embodiment, as illustrated, the predetermined temperature TL1 is set, such that the line L1 is present below the line L3 (i.e., the line L1 has a smaller value of the target current IL*) with regard to an arbitrary value of the ambient temperature Ta in the expected temperature range. More specifically, by taking into account that the absolute value of the slope of the line L3 is larger than the absolute value of the slope of the line L1, the predetermined temperature TL1 is set, such that the predetermined-time target current ILa of the reactor L becomes equal to or slightly smaller than the predetermined-time target current ILc when the ambient temperature to is equal to the upper limit temperature Tamax. Due to such setting of the predetermined temperature TL1, it is expected that the temperature Tc of the capacitor 46 is equal to or lower than the predetermined temperature Tc1 when the temperature TL of the reactor L reaches the predetermined temperature TL1 during drive of the electric vehicle 20. Accordingly, setting the predetermined temperature TL1 to the temperature reference value TLref and setting the allowable current ILlim of the reactor L (allowable torque Tmlim of the motor 32) based on this temperature reference value TLref and the temperature TL of the reactor L with regard to an arbitrary value of the ambient temperature Ta in the expected temperature range suppresses the temperature TL of the reactor L and the temperature Tc of the capacitor 46 from exceeding respective allowable temperatures TLlim and Tmlim without providing a current sensor mounted to the capacitor 46. This accordingly protects the reactor L and the capacitor 46. There is, however, a large difference between the line L1 and the line L3 in a range of the low ambient temperature Ta. By taking into account this fact, as illustrated, the predetermined temperature TL2 is set, such that the line L2 and the line L3 intersect with each other in the expected temperature range of the ambient temperature Ta. The ambient temperature Ta at this intersection point is set as the temperature reference value Taref described above. In a range of the ambient temperature Ta that is lower than the temperature reference value Taref, the predetermined temperature TL2 that is higher than the predetermined temperature TL1 is set to the temperature reference value TLref, and the allowable current ILlim of the reactor L (the allowable torque Tmlim of the motor 32) is set, based on this temperature reference value TLref and the temperature TL of the reactor L. This protects the reactor L and the capacitor 46, like the case of setting the predetermined temperature TL1 to the allowable temperature TLlim. This also has advantageous effects described below, in addition to this advantageous effect. Compared with the case of setting the predetermined temperature TL1 to the temperature reference value TLref, this more effectively suppresses the temperature TL of the reactor L from becoming higher than the temperature reference value TLref, more effectively suppresses the allowable current ILlim of the reactor L from becoming small relative to the rated current ILrat (suppresses the allowable torque Tmlim of the motor 32 from becoming small relative to the rated torque Tmrat), and suppresses deterioration of the performance of the boost converter 40 and thereby deterioration of the driving performance of the electric vehicle 20.

As described above, the driving system mounted on the electric vehicle 20 of the embodiment is configured to limit the allowable current ILlim of the reactor L when the temperature TL of the reactor L becomes higher than the temperature reference value TLref that is lower than the heatproof temperature TLhr, compared with the allowable current ILlim when the temperature TL of the reactor L is equal to or lower than the temperature reference value TLref. When the ambient temperature Ta is equal to or higher than the temperature reference value Taref, the predetermined temperature TL1 is set to the temperature reference value TLref. When the ambient temperature Ta is lower than the temperature reference value Taref, on the other hand, the predetermined temperature TL2 that is higher than the predetermined temperature TL1 is set to the temperature reference value TLref. This configuration protects the reactor L and the capacitor 46 without providing a temperature sensor mounted to the capacitor 46 (i.e, without directly detecting the temperature Tc of the capacitor 46). This configuration also suppresses the temperature TL of the rector L from becoming higher than the temperature reference value TLref when the ambient temperature Ta is lower than the temperature reference value Taref and suppresses deterioration of the performance of the boost converter 40 and thereby deterioration of the driving performance of the electric vehicle 20.

The driving system mounted on the electric vehicle 20 of the embodiment is provided with the single-phase boost converter 40 that includes the transistors T31 and T32, the diodes D31 and D32 and the reactor L. According to a modification, the driving system may be provided with a multi-phase boost converter, for example, a two-phase, three-phase or four-phase boost converter.

In the driving system mounted on the electric vehicle 20 of the embodiment, the reactor L of the boost converter 40 and the capacitor 46 are placed in the identical housing. According to a modification, the reactor L and the capacitor 46 may be placed in different housings.

Figure 5:
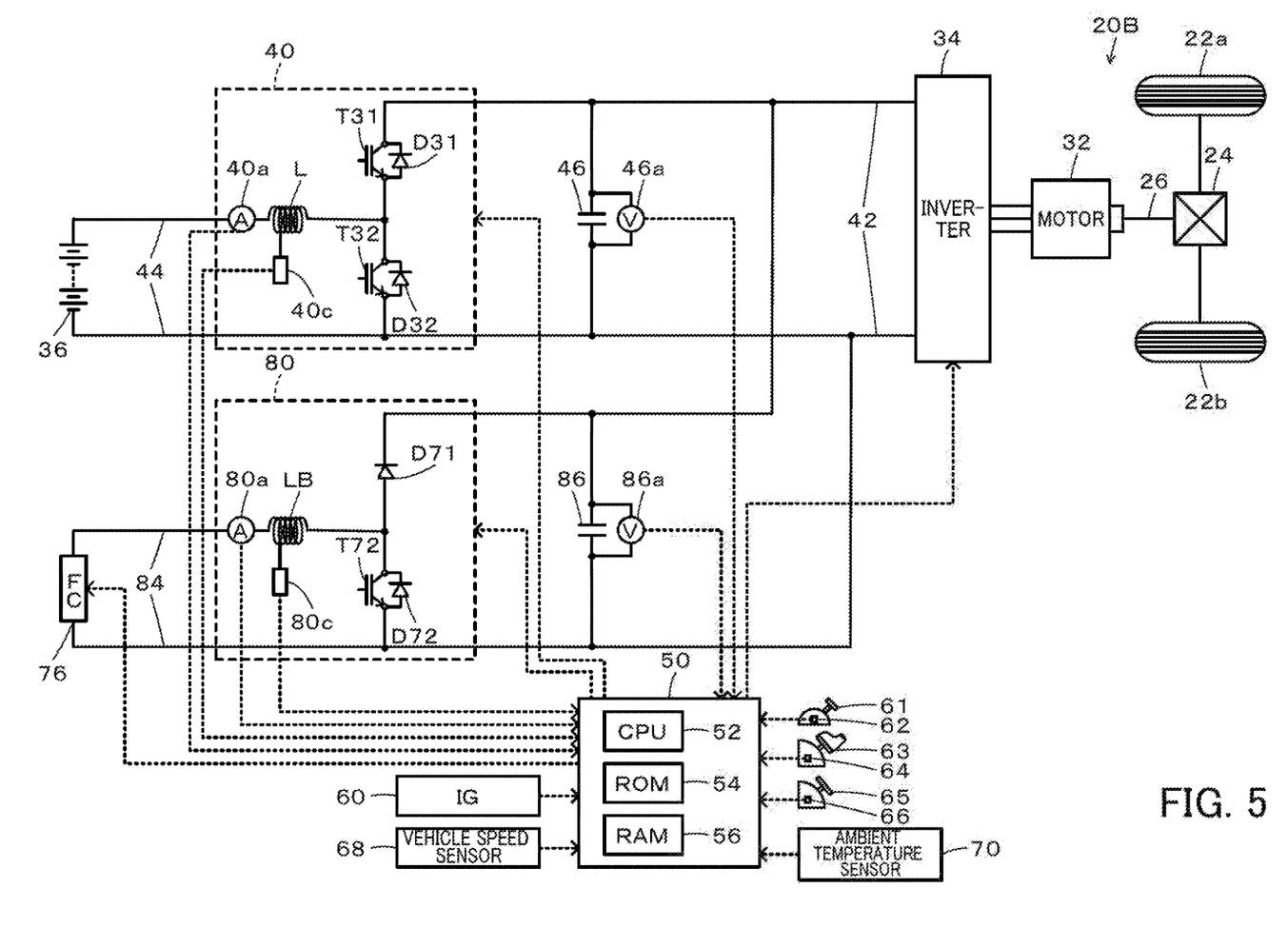
FIG. 5 is a configuration diagram illustrating the schematic configuration of a fuel cell vehicle according to a modification.

The embodiment describes application of the aspect of the present disclosure to the configuration of the electric vehicle 20 including the motor 32, the inverter 34, the battery 36, the boost converter 40 and the capacitor 46 as shown in FIG. 1. This is, however, not restrictive, but the aspect of the present disclosure may be applied to the configuration of a fuel cell vehicle 20B as shown in FIG. 5. The fuel cell vehicle 20B of FIG. 5 has a similar hardware configuration to the configuration of the electric vehicle 20 of the embodiment, except addition of a fuel cell 76, a boost converter 80 and a capacitor 86. Like components of the hardware configuration of the fuel cell vehicle 20B to those of the hardware configuration of the electric vehicle 20 of the embodiment are expressed by like reference signs, and their detailed description is omitted.

The fuel cell 76 is configured to generate electric power by an electrochemical reaction of hydrogen as a fuel gas that is supplied from a high pressure hydrogen tank and that is circulated by a fuel pump (circulation pump) and oxygen in the air that is supplied by an oxygen pump (air compressor) and that is humidified by a humidifier, and is connected with the boost converter 80 via low voltage-side power lines 84. This fuel cell 76 is operated and controlled by the electronic control unit 50.

The boost converter 80 is connected with the high voltage-side power lines 42 and with the low voltage-side power lines 84 and includes two diodes D71 and D72, a transistor T72 connected in parallel with the diode D72, and a reactor LB. The diode D71 is connected with the positive electrode line of the high voltage-side power lines 42. The diode D72 is connected with the diode D71 and with negative electrode lines of the high voltage-side power lines 42 and the low voltage-side power lines 84. The reactor LB is connected with a connection point between the diodes D71 and D72 and with a positive electrode line of the low voltage-side power lines 84. In response to regulation of a ratio of ON time of the transistor T72 by the electronic control unit 50, the boost converter 80 serves to step up the voltage of electric power of the low voltage-side power lines 84 and supply the electric power of the stepped-up voltage to the high voltage-side power lines 42. The capacitor 86 is mounted to the positive electrode line and the negative electrode line of the high voltage-side power lines 42 in the vicinity of the boost converter 80.

The electronic control unit 50 obtains inputs of an electric current ILB of the reactor LB (input current of the boost converter 80) from a current sensor 80a that is mounted in series with the reactor LB of the boost converter 80, a temperature TLB of the reactor LB from a temperature sensor 80c that is mounted to the reactor LB, and a voltage VHB of the capacitor 86 (i.e., high voltage-side power lines 42) from a voltage sensor 86a that is placed between terminals of the capacitor 86 via the input port, in addition to the signals from various sensors similar to those in the electric vehicle 20. The electronic control unit 50 outputs a control signal to the fuel cell 76 and a control signal to the transistor T72 of the boost converter 80 via the output port, in addition to various control signals similar to those in the electric vehicle 20.

In the fuel cell vehicle 20B of the modification having the configuration described above, the electronic control unit 50 controls the motor 32, the boost converter 40, the fuel cell 76 and the boost converter 80, such that the required torque Td* is output to the driveshaft 26. More specifically, the electronic control unit 50 performs control of the motor 32 similar to that in the electric vehicle 20 of the embodiment, except setting an allowable torque Tmlim of the motor 32 based on allowable currents ILlim and ILBlim of the reactors L and LB of the boost converters 40 and 80. The electronic control unit 50 performs control of the boost converter 40 similar to that in the electric vehicle 20 of the embodiment. The electronic control unit 50 performs control of the fuel cell 76 to set a tentative target generated power Pftmp that is a tentative value of a target generated power Pf*, based on the torque command Tm* of the motor 32, to set an allowable generated power Pflim based on the allowable current ILBlim of the reactor LB, to set the target generated power Pf* by limiting the tentative target generated power Pftmp to the allowable generated power Pflim (upper limit guarding), and to operate and control the fuel cell 76, such that a generated power Pf of the fuel cell 76 becomes equal to the target generated power Pf*. The fuel cell 76 may be operated intermittently. The electronic control unit 50 performs control of the boost converter 80 similar to the control of the boost converter 40 performed in the electric vehicle 20. More specifically, the electronic control unit 50 limits the allowable current ILBlim of the reactor LB when the temperature TLB of the reactor LB becomes higher than a temperature reference value TLBref that is lower than a heatproof temperature TLBhr of the reactor LB, compared with the allowable current ILBlim when the temperature TLB of the reactor LB is equal to or lower than the temperature reference value TLBref. When the ambient temperature Ta is equal to or higher than a temperature reference value Taref2, a predetermined temperature TL3 is set to the temperature reference value TLBref. When the ambient temperature Ta is lower than the temperature reference value Taref2, on the other hand, a predetermined temperature TL4 that is higher than the predetermined temperature TL3 is set to the temperature reference value TLBref. The predetermined temperatures TL3 and TL4 and the temperature reference value Taref2 are set by a method similar to the method of setting the predetermined temperatures TL1 and TL2 and the temperature reference value Taref.

Such control protects the reactor L of the boost converter 40, the reactor LB of the boost converter 80, and the capacitors 46 and 86 without providing temperature sensors mounted to the capacitors 46 and 86 and suppresses deterioration of the performances of the boost converters 40 and 80 in the state of low ambient temperature and thereby deterioration of the driving performance of the fuel cell vehicle 20B.

This modification applies the aspect of the present disclosure to the controls of the boost converters 40 and 80. Another modification may apply the aspect of the present disclosure to only one of these controls. For example, an additional temperature sensor may be provided to detect the temperature Tc of the capacitor 46, and the allowable current ILlim of the reactor L may be set, based on the temperature TL of the reactor L and the temperature Tc of the capacitor 46.

Figure 6:
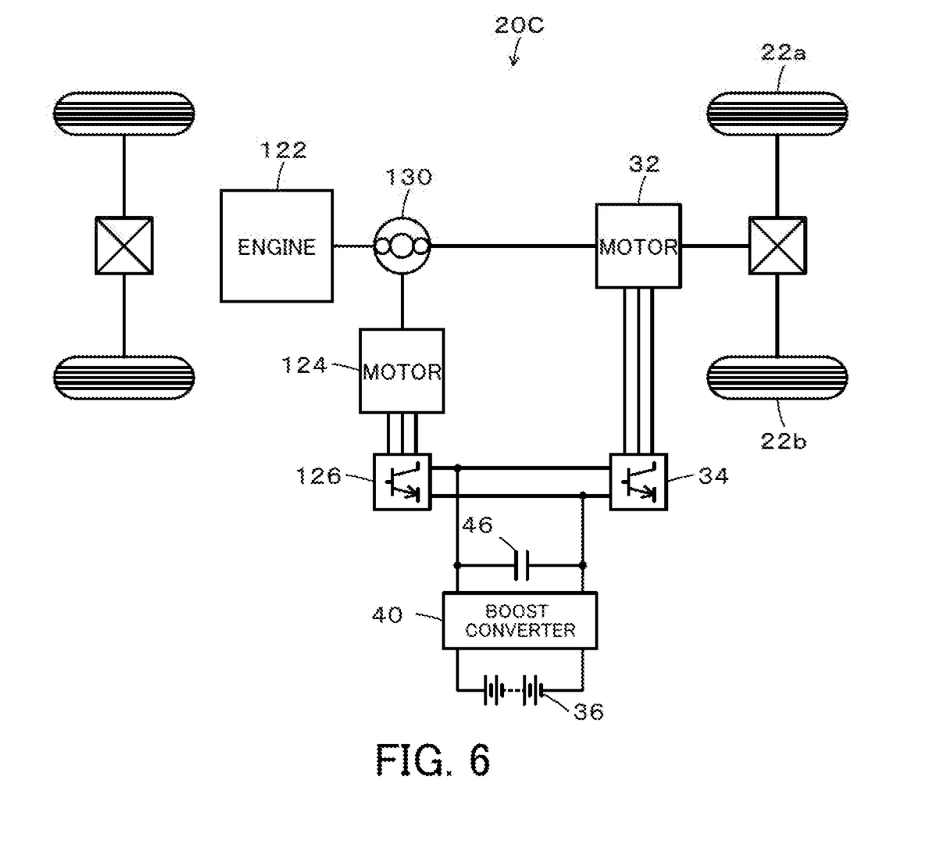
FIG. 6 is a configuration diagram illustrating the schematic configuration of a hybrid vehicle according to another modification.

The embodiment describes application of the aspect of the present disclosure to the configuration of the electric vehicle 20 including the motor 32, the inverter 34, the battery 36, the boost converter 40 and the capacitor 46 as shown in FIG. 1. This is, however, not restrictive, but the aspect of the present disclosure may be applied to the configuration of a hybrid vehicle that is provided with an engine in addition to the hardware configuration of the electric vehicle 20. The hybrid vehicle may be configured such that a motor 32 is connected with drive wheels 22a and 22b, that an engine 122 and a motor 124 are connected with the drive wheels 22a and 22b via a planetary gear 130, and that a battery 36 is connected with the motors 32 and 124 via inverters 34 and 126, like a hybrid vehicle 20C of a modification shown in FIG. 6.

In the driving system of this aspect, the first temperature may be set, such that the input current of the boost converter at the temperature of the reactor reaching the first temperature becomes equal to or lower than the input current of the boost converter at temperature of the capacitor reaching a third temperature that is lower than a heatproof temperature of the capacitor, with regard to any expected value of the ambient temperature.

In the driving system of another aspect, the predetermined temperature may set to a value of the ambient temperature when the input current of the boost converter at the temperature of the reactor reaching the second temperature becomes equal to the input current of the boost converter at temperature of the capacitor reaching a third temperature that is lower than a heatproof temperature of the capacitor. In the driving system of this aspect, the predetermined temperature may be determined as an ambient temperature at an intersection point of a first line that indicates a relationship between the input current of the boost converter and the ambient temperature when the temperature of the reactor becomes equal to the second temperature and a second line that indicates a relationship between the input current of the boost converter and the ambient temperature when the temperature of the capacitor becomes equal to the third temperature. This enables the predetermined temperature to be set more appropriately.

In the driving system of another aspect, the reactor and the capacitor may be placed in an identical housing.

The following describes a correspondence relationship between the primary components of the embodiment described above and the primary components in the respective aspects of the present disclosure described in Summary. The boost converter 40, the capacitor 46 and the electronic control unit 50 of the embodiment respectively correspond to the "boost converter", the "capacitor" and the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the driving system and so on.

What is claimed is:

1. A driving system, comprising:
a boost converter provided to include a switching element, a diode and a reactor and configured to step up a voltage of an electric power of a low voltage-side power line that is connected with a power source and supply the electric power of the stepped-up voltage to a high voltage-side power line that is connected with a power device;
a capacitor mounted to the high voltage-side power line; and
a control device configured to decrease an input current of the boost converter when a temperature of the reactor becomes higher than a temperature reference value that is lower than a heatproof temperature of the reactor, the input current of the boost converter being lower when the temperature of the reactor becomes higher than the temperature reference value compared with the input current when the temperature of the reactor is equal to or lower than the temperature reference value, wherein the control device sets the temperature reference value to a first temperature when ambient temperature is equal to or higher than a predetermined temperature, and sets the temperature reference value to a second temperature that is higher than the first temperature when the ambient temperature is lower than the predetermined temperature.

2. The driving system according to claim 1, wherein the input current of the boost converter at the first temperature is equal to or lower than the input current of the boost converter when a temperature of the capacitor is lower than a heatproof temperature of the capacitor.

3. The driving system according to claim 1, wherein the predetermined temperature is set to the ambient temperature when the input current of the boost converter at the second temperature is equal to the input current of the boost converter when the temperature of the capacitor is lower than the heatproof temperature of the capacitor.

4. The driving system according to claim 2, wherein the predetermined temperature is set to the ambient temperature when the input current of the boost converter at the second temperature is equal to the input current of the boost converter when the temperature of the capacitor is lower than the heatproof temperature of the capacitor.

5. The driving system according to claim 1, wherein the reactor and the capacitor are placed in the same housing.

* * * * *